(12) United States Patent
Sun et al.

(10) Patent No.: US 8,179,781 B2
(45) Date of Patent: May 15, 2012

(54) METHOD AND APPARATUS FOR ENCODING DATA FOR TRANSMISSION IN A COMMUNICATION SYSTEM

(75) Inventors: Feng-Wen Sun, Germantown, MD (US); Khalid Karimullah, Olney, MD (US); Lin-Nan Lee, Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 861 days.

(21) Appl. No.: 11/999,561

(22) Filed: Dec. 6, 2007

(65) Prior Publication Data

US 2008/0285521 A1  Nov. 20, 2008

Related U.S. Application Data

(62) Division of application No. 10/037,982, filed on Jan. 3, 2002, now Pat. No. 7,317,710, which is a division of application No. 09/114,646, filed on Jul. 13, 1998, now Pat. No. 6,396,222.

(60) Provisional application No. 60/052,574, filed on Jul. 15, 1997.

(51) Int. Cl.
  *H04J 11/00* (2006.01)
  *H04B 3/20* (2006.01)
(52) U.S. Cl. ........................................ 370/208; 370/318
(58) Field of Classification Search .................... 370/208
  See application file for complete search history.

(56) References Cited

U.S. PATENT DOCUMENTS

| | | | |
|---|---|---|---|
| 4,425,642 A | 1/1984 | Moses et al. | |
| 5,274,665 A | 12/1993 | Schilling | |
| 5,416,797 A | 5/1995 | Gilhousen | |
| 5,465,396 A | 11/1995 | Hunsinger et al. | |
| 5,640,385 A | 6/1997 | Long et al. | |
| 5,751,761 A * | 5/1998 | Gilhousen | ................ 375/146 |
| 5,754,599 A | 5/1998 | Ling | |
| 5,818,887 A | 10/1998 | Sexton | |
| 5,830,064 A | 11/1998 | Bradish et al. | |
| 5,862,132 A | 1/1999 | Blanchard et al. | |
| 5,864,577 A | 1/1999 | Ramel | |
| 5,889,768 A | 3/1999 | Storm et al. | |
| 5,903,610 A | 5/1999 | Skold | |
| 5,940,439 A | 8/1999 | Kleider | |
| 5,956,345 A | 9/1999 | Allpress et al. | |
| 5,960,045 A | 9/1999 | Duponteil | |
| 5,966,377 A * | 10/1999 | Murai | ...................... 370/342 |
| 5,970,400 A | 10/1999 | Dwyer | |
| 6,021,309 A | 2/2000 | Sherman et al. | |
| 6,038,263 A * | 3/2000 | Kotzin et al. | ................ 375/299 |
| 6,038,695 A | 3/2000 | Pehkonen | |

(Continued)

OTHER PUBLICATIONS

Notice of Allowance dated Nov. 10, 2010 in U.S. Appl. No. 12/435,237, filed May 4, 2009 by Mustafa Eroz et al.

(Continued)

*Primary Examiner* — Jeffrey Pwu
*Assistant Examiner* — Shaq Taha

(57) ABSTRACT

A method and apparatus for encoding data for transmission in a communication system provides increased efficiency in bandwidth utilization through higher data rates, lower error rates, lower power levels, and/or increased capacity. A set of orthogonal codes is partitioned into subsets. The data to be transmitted is partitioned into packets of bit sequences, each of which is mapped to an orthogonal code in an assigned subset. The number of members in a particular subset is determined by the relative transmission requirements of the data signal the subset will be used to encode.

18 Claims, 7 Drawing Sheets

U.S. PATENT DOCUMENTS

| | | | |
|---|---|---|---|
| 6,052,408 | A | 4/2000 | Trompower et al. |
| 6,064,663 | A * | 5/2000 | Honkasalo et al. ........... 370/335 |
| 6,064,665 | A | 5/2000 | Leuck |
| 6,097,711 | A | 8/2000 | Okawa et al. |
| 6,122,260 | A * | 9/2000 | Liu et al. ........................ 370/280 |
| 6,141,388 | A | 10/2000 | Servais |
| 6,182,265 | B1 | 1/2001 | Lim |
| 6,192,503 | B1 | 2/2001 | Chennakeshu |
| 6,222,819 | B1 | 4/2001 | Lysejko |
| 6,222,828 | B1 * | 4/2001 | Ohlson et al. .................. 370/320 |
| 6,233,456 | B1 * | 5/2001 | Schiff et al. ................... 455/439 |
| 6,570,865 | B2 | 5/2003 | Masui et al. |
| 6,842,442 | B2 | 1/2005 | Okawa et al. |
| 7,536,624 | B2 | 5/2009 | Eroz et al. |

OTHER PUBLICATIONS

Non-final Office action dated Dec. 29, 2010 in U.S. Appl. No. 12/404,251, filed Mar. 13, 2009 by Feng-Wen Sun et al.
Non-final Office action dated May 5, 2010 in U.S. Appl. No. 12/435,237, filed May 4, 2009 by Mustafa Eroz et al.
Non-final Office action dated May 21, 2010 in U.S. Appl. No. 12/404,251, filed Mar. 13, 2009 by Feng-Wen Sun et al.
Final Rejection dated Sep. 8, 2010 in U.S. Appl. No. 12/404,251, filed Mar. 13, 2009 by Feng-Wen Sun et al.
Final Rejection dated Apr. 6, 2011 in U.S. Appl. No. 12/404,251, filed Mar. 13, 2009 by Feng-Wen Sun et al.
Benedetto, Sergio; Montorsi, Guido; "Design Guidelines of Parallel Concatenated Convolutional Codes"; IEEE Globecon; 1995; pp. 2273-2277.
Notice of Allowance dated Nov. 30, 2011 in U.S. Appl. No. 13/025,378, filed Feb. 11, 2011 by Mustafa Eroz et al.
Final Rejection dated Oct. 5, 2011 in U.S. Appl. No. 12/404,251, filed Mar. 13, 2009 by Feng-Wen Sun et al.
Non-final Office action dated Mar. 6, 2012 in U.S. Appl. No. 12/404,251, filed Mar. 13, 2009 by Feng-Wen Sun et al.

* cited by examiner

METHOD AND APPARATUS FOR ENCODING DATA FOR TRANSMISSION IN A COMMUNICATION SYSTEM

RELATED APPLICATION

This application is a divisional of U.S. patent application Ser. No. 10/037,982, filed Jan. 3, 2002, now U.S. Pat. No. 7,317,710 entitled "Method and Apparatus for Encoding Data for Transmission in a Communication System", which is a divisional of U.S. patent application Ser. No. 09/114,646, filed Jul. 13, 1998, now issued May 28, 2002 as U.S. Pat. No. 6,396,822, which is related to, and claims priority to U.S. Provisional Patent Application Ser. No. 60/052,574, filed Jul. 15, 1997, entitled "Method and Apparatus for Encoding Data for Transmission in a Communication System"; the entireties of which are incorporated herein by reference.

TECHNICAL FIELD OF THE INVENTION

The present invention relates generally to radio communication systems, and more particularly to a method and apparatus for encoding data for transmission in a radio communication system.

BACKGROUND OF THE INVENTION

Radio communication systems rely on modulating carrier frequencies in a finite portion of the electromagnetic spectrum to wirelessly transmit and receive signals. Modulation can be performed on the amplitude, frequency, and/or phase of the carrier frequency to separate the signal from unwanted noise. The signals typically convey various types of information such as audio, video, and data to and from transceiving devices such as cellular base stations, cellular subscriber units, and personal computers.

In code division multiple access communication systems, a plurality of transmissions, each with its own code, can share the same band of frequencies. Each transmission is spread over the available bandwidth by mixing the signal to be transmitted with that signal's unique code. For a CDMA system, spreading gain is defined as the ratio of chip rate to information data rate. This ratio also quantifies the redundancy for any particular user. Typically, information data stream is first encoded by a forward error correction (FEC) code such as a convolutional code. The FEC encoded data stream then is further spreaded by a code from an orthogonal codeword set.

In the forward link (the link from base station to the mobile station), prior art systems assign each user a single codeword from the orthogonal codeword set. By alternating transmission spreading between the assigned orthogonal code and its compliment, information is conveyed from a transmitter to a receiver. Since different transmitters use distinct codewords, the receiver can correlate the designated transmitter's orthogonal code to retrieve its information and minimize interference. Therefore, in the forward link, the orthogonal code has two functions, spreading and channelization. In spite of the large redundancy used by the spreading, this conventional orthogonal spreading/channelization does not provide any coding gains.

SUMMARY OF THE INVENTION

In accordance with a first aspect of the invention, a method for encoding data for transmission in a communication system, is provided. The method comprises the steps of partitioning a set of orthogonal codes into first and second subsets with a first and second number of members respectively, the second number of members being different than the first number of members. The method further comprises the step of partitioning first and second pluralities of data bits associated with first and second transmissions into first and second packets respectively. Still further, the method comprises encoding the first plurality of data bits by assigning each first packet to a corresponding member of the first subset and encoding the second plurality of data bits by assigning each second packet to a corresponding member of the second subset.

In some preferred embodiments, the communication system comprises a CDMA communication system. In other preferred embodiments, the first and/or second plurality of data bits represents an audio, video, and/or data signal. In still other preferred embodiments, the first plurality of data bits requires a lower power level than the second plurality of data bits and the first number of members is higher than the second number of members. In some embodiments, the first plurality of data bits requires a higher data rate than the second plurality of data bits and the first number of members is higher than the second number of members. In certain embodiments, the first plurality of data bits requires a lower error rate than the second plurality of data bits and the first number of members is higher than the second number of members.

In accordance with a further aspect of the present invention, a method for encoding data for transmission in a communication system is provided. The method comprises the step of partitioning a set of orthogonal codes into a subset with at least three members. The method further comprises the steps of partitioning a plurality of data bits into packets and encoding the plurality of data bits by assigning each packet to a corresponding member of the subset.

In accordance with another aspect of the present invention, a method for increasing the terminal capacity of a CDMA communication system is provided. The method comprises the step of providing a set of orthogonal codes. The method further comprises the steps of assigning at least three of the orthogonal codes in the set to a transmission and decreasing power associated with the transmission thereby increasing the number of transmissions capable of utilizing the CDMA communication system at a given time.

In accordance with yet another aspect of the present invention, a method for increasing the data capacity of a CDMA communication system is provided. The method comprises the step of providing a set of orthogonal codes. The method further comprises the steps of assigning at least three of the orthogonal codes in the set to a transmission and increasing a data rate associated with the transmission thereby increasing the amount of data transmitted by the CDMA communication system.

In accordance with still another aspect of the present invention, a method for decreasing the errors in a CDMA communication system is provided. The method comprises the step of providing a set of orthogonal codes. The method further comprises the steps of assigning at least three of the orthogonal codes in the set to a transmission and lengthening an error code associated with the transmission thereby decreasing the number of errors in the CDMA communication system.

In accordance with yet another aspect of the present invention, an apparatus for encoding a signal associated with a communication in a wireless communication system is provided. The apparatus comprises a memory storing a set of orthogonal codes. The apparatus further comprises a signal partitioner for partitioning the signal to be transmitted into packets having a number of members and a code partitioner for assigning a subset of the set of orthogonal codes to the communication, the subset including at least three codes. The apparatus also comprises an encoder for mapping the packets of the signal to the subset of the orthogonal codes.

BRIEF DESCRIPTION OF THE DRAWINGS

These and other features and advantages of the present invention will become more apparent from a detailed consideration of the following detailed description of certain preferred embodiments when taken in conjunction with the drawings in which.

DETAILED DESCRIPTION OF THE PREFERRED EMBODIMENTS

Although for simplicity of explanation the following description focuses primarily on encoding data for transmission in a communication system having one or two transmitters, persons of ordinary skill in the art will readily appreciate that the techniques of the present invention are in no way limited to communication systems with only one or two transmitters. On the contrary, a communication system having any number of transmitters sending data streams representing different uses and/or services (e.g., audio, video, pocket data) may employ the techniques shown herein. Further, although for ease of discussion, the following description focuses on a method and apparatus for encoding data for transmission wherein one of the data stream employs a first subset of orthogonal codes for encoding and another data stream employs a second subset of orthogonal codes for encoding; persons of ordinary skill in the art will appreciate that any number of orthogonal code subsets may be employed without departing from the scope of the present invention.

Figure 1:
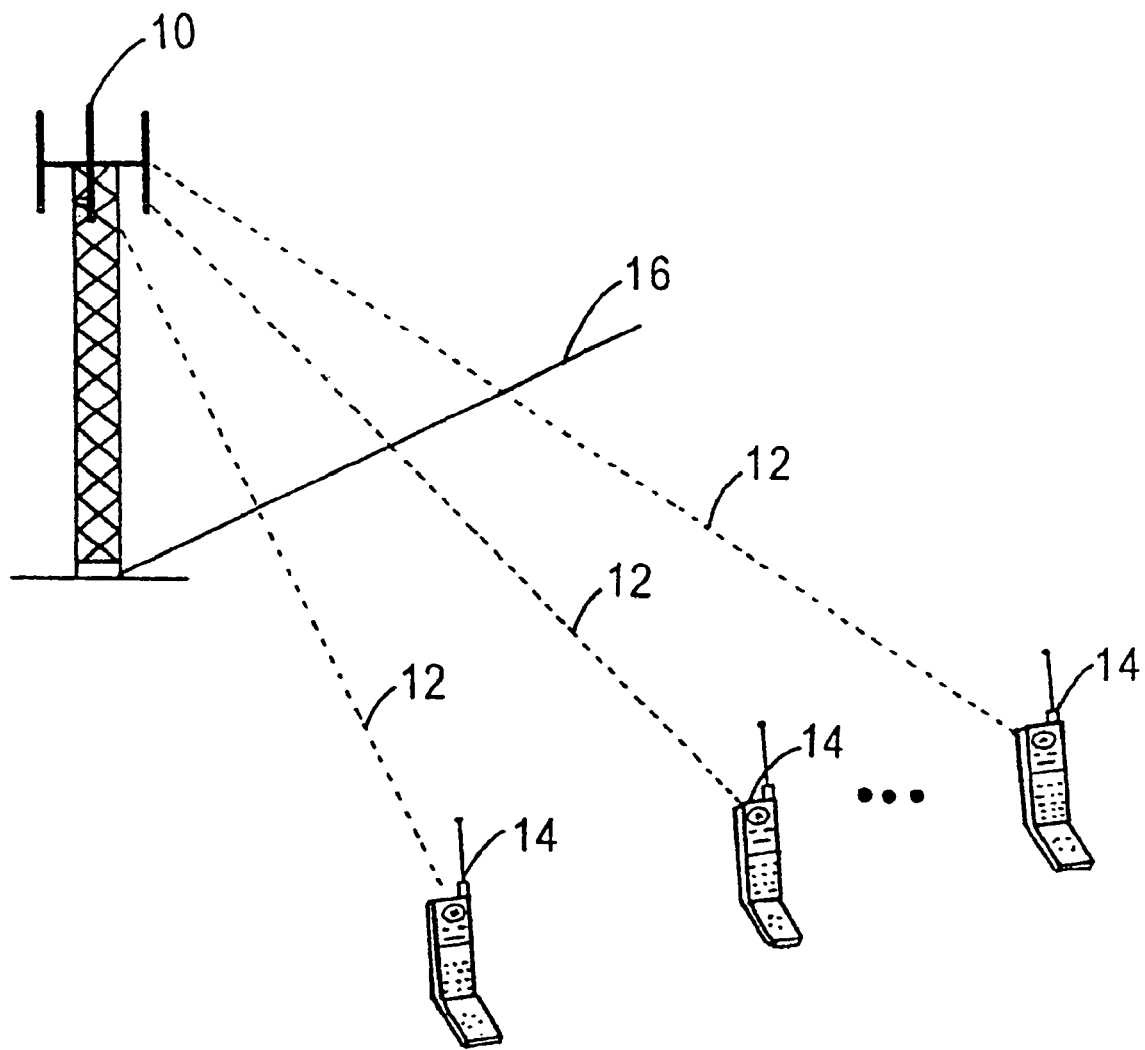
FIG. 1 is a schematic illustration of a communication system capable of utilizing the teachings of the present invention.

A representative communication system capable of utilizing the teachings of the present invention is shown in FIG. 1. A base station 10, such as a cellular communications base station or a satellite, is used to transmit and receive a plurality of radio signals 12 to and/or from a plurality of terminals 14, such as voice terminals (e.g., cellular subscriber units) and/or data terminals (e.g., computers). The base station 10 is optionally coupled to a network 16, such as a public switched telephone network (PSTN), the Internet, and/or any other analog or digital network. Signals 12 transmitted to the terminals 14 by the base station 10 could originate from a device connected to the network 16. Similarly, radio signals 12 transmitted to the base station 10 by the terminals 14 could be destined for a device connected to the network 16. The radio signals 12 are transmitted by modulating a carrier frequency. The radio signals 12 could be representative of audio signals (e.g., voice signals), video signals (e.g., television signals), data messages (e.g., computer data), and/or any other signals or combinations of signals. Preferably, the terminals 14 share the available electromagnetic spectrum by using code-division multiple access (CDMA), a well known multiple access technique.

Figure 2:
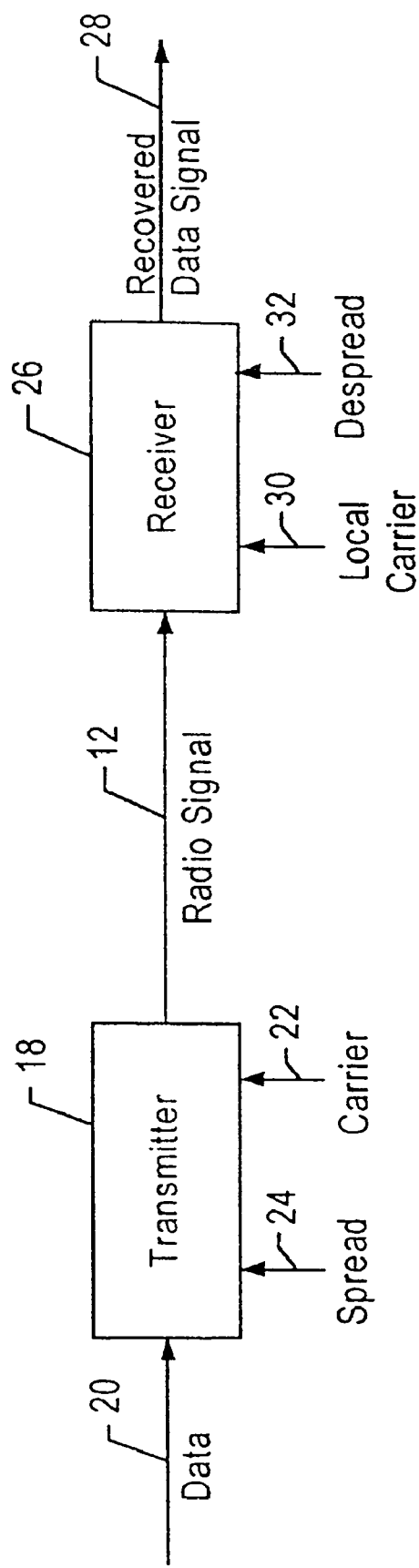
FIG. 2 is a block diagram of a typical code-division multiple access transmitter and receiver.

A typical code-division multiple access communication system is shown in FIG. 2. A transmitter 18 (integral to the base station 10 or terminal 14) spreads 24 a data signal 20, representing a message to be sent, and mixes the result with a carrier 22 to produce the radio signal 12. The radio signal 12 is captured by a receiver 26 (integral to the terminal 14 or base station 10) which recovers an estimate 28 of the data signal 20 by mixing the radio signal 12 with a local carrier 30 and despreading the signal 32.

Figure 3:
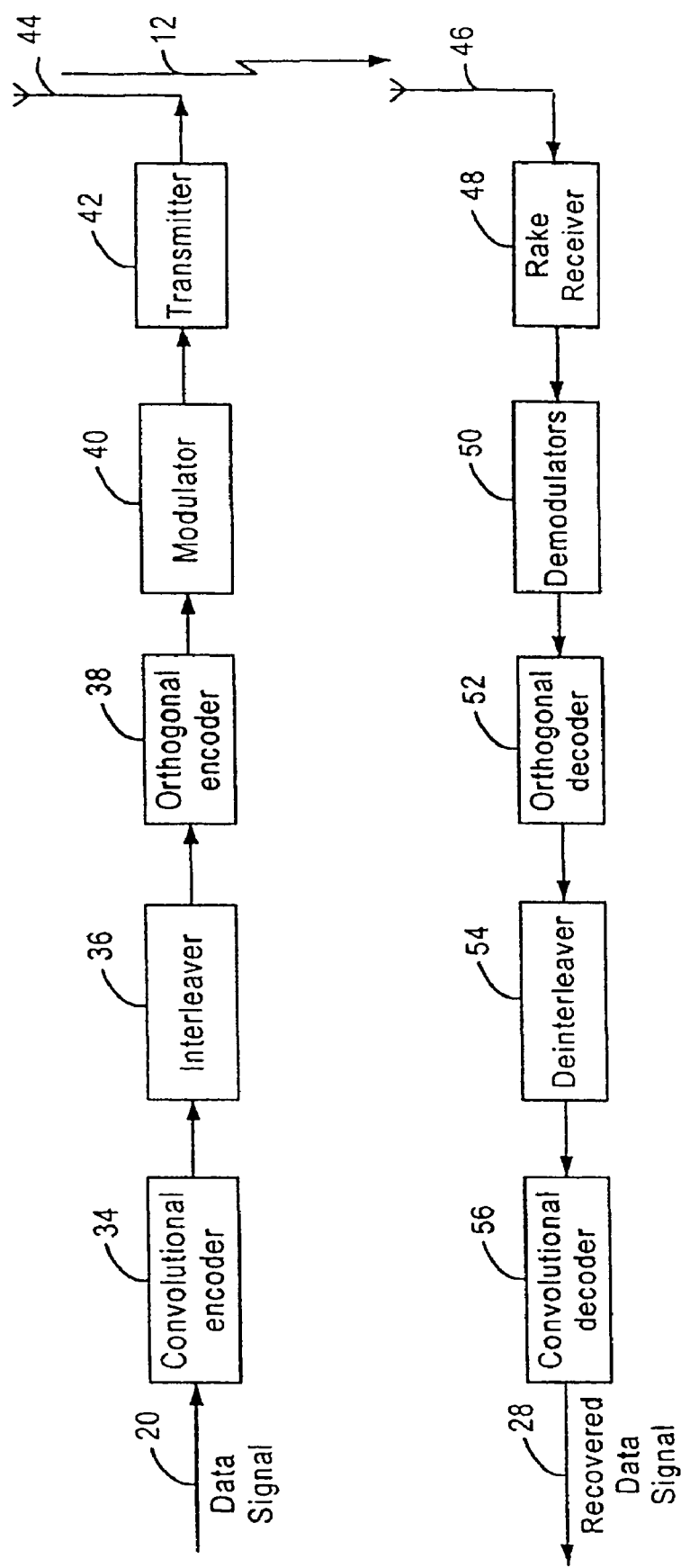
FIG. 3 is a more detailed diagram of the transmitter and receiver of FIG. 2.

A more detailed diagram of the transmitter 18 and receiver 26 of FIG. 2 is shown in FIG. 3. The data signal 20 to be transmitted is preferably wrapped around a forward error correction code by a conventional convolutional encoder 34, typically comprising shift registers and modulo-2 adders. As is well known in the art, the adders create check digits that are a function of a particular subset of the data signal to be transmitted as it is passed through the shift registers. Since convolutional encoding works most effectively on random (non-consecutive) errors, and since burst errors are common in wireless environments, the encoded signal is typically interleaved by an interleaver 36. The interleaver 36 shuffles the bits into a random sequence, thus making burst errors appear to be random errors after deinterleaving.

In the preferred embodiment, the interleaved code is then divided into short bit sequences (e.g., six bits), each of which is mapped to an orthogonal code (e.g., a 64 bit Walsh code) by an orthogonal encoder 38. The orthogonal codes may then be sent to a modulator 40 and a transmitter 42 for communication from a transmitting antenna 44 to a receiving antenna 46. The receiving antenna 46 is preferably coupled to a rake receiver 48 and demodulators 50 to capture the radio signal 12 in a known manner. An orthogonal decoder 52 may be used to recover the radio signal 12. Once recovered, the data is typically restored to its original sequence by a deinterleaver 54 and the forward error correction code may be removed by a convolutional decoder 56.

Figure 4:
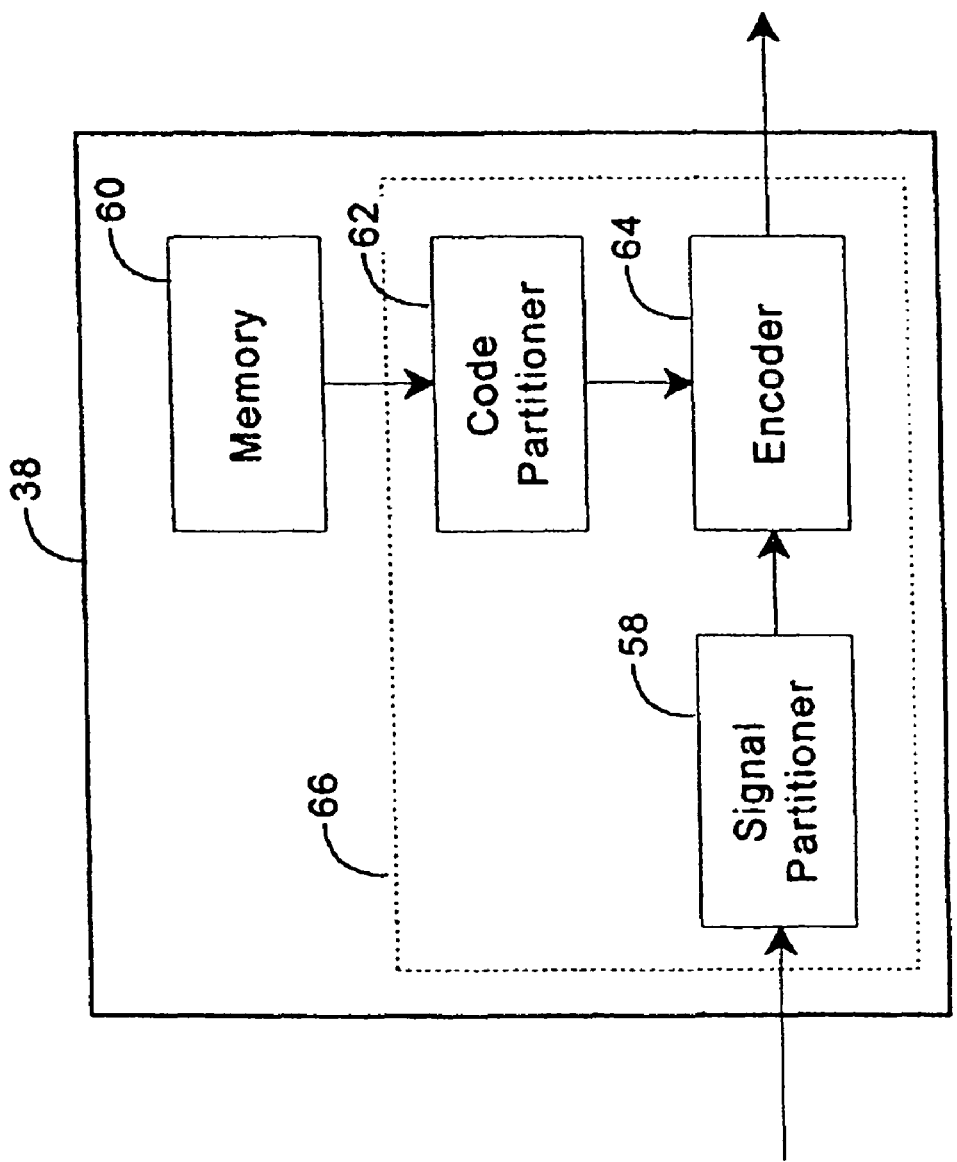
FIG. 4 is a more detailed block diagram of the orthogonal encoder of FIG. 3 in accordance with the teachings of the present invention.

A more detailed diagram of the orthogonal encoder 38 is illustrated in FIG. 4. A signal associated with a communication preferably enters the orthogonal encoder 38 and is partitioned into packets having a predetermined number of members by a signal partitioner 58. The number of members is typically determined when the call is initialized. A memory device 60 internal to the orthogonal encoder 38 or external and accessible to the orthogonal encoder 38 retains a set of orthogonal codes. A code partitioner 62 preferably assigns a subset of the set of orthogonal codes to the communication. The subset may include any number of orthogonal codes, however in the preferred embodiment of the present invention the subset includes at least three orthogonal codes. Typically the subset will include a number of orthogonal codes equal to a power of two (e.g., 2, 4, 8, . . . ). An encoder 64 then preferably maps the packets of the signal to the subset of the orthogonal codes and outputs an encoded signal. The signal partitioner 58, code partitioner 62, and/or encoder 64 may be integrated circuits and/or software performed by a microprocessor. For example, an application specific integrated circuit (ASIC) or a microprocessor could be used to realize block 66.

The memory device 60 may be an array of static random access memory (SRAM) cells, dynamic random access memory (DRAM), read only memory (ROM), FLASH, or any other type of memory or a combination thereof.

Figure 5:
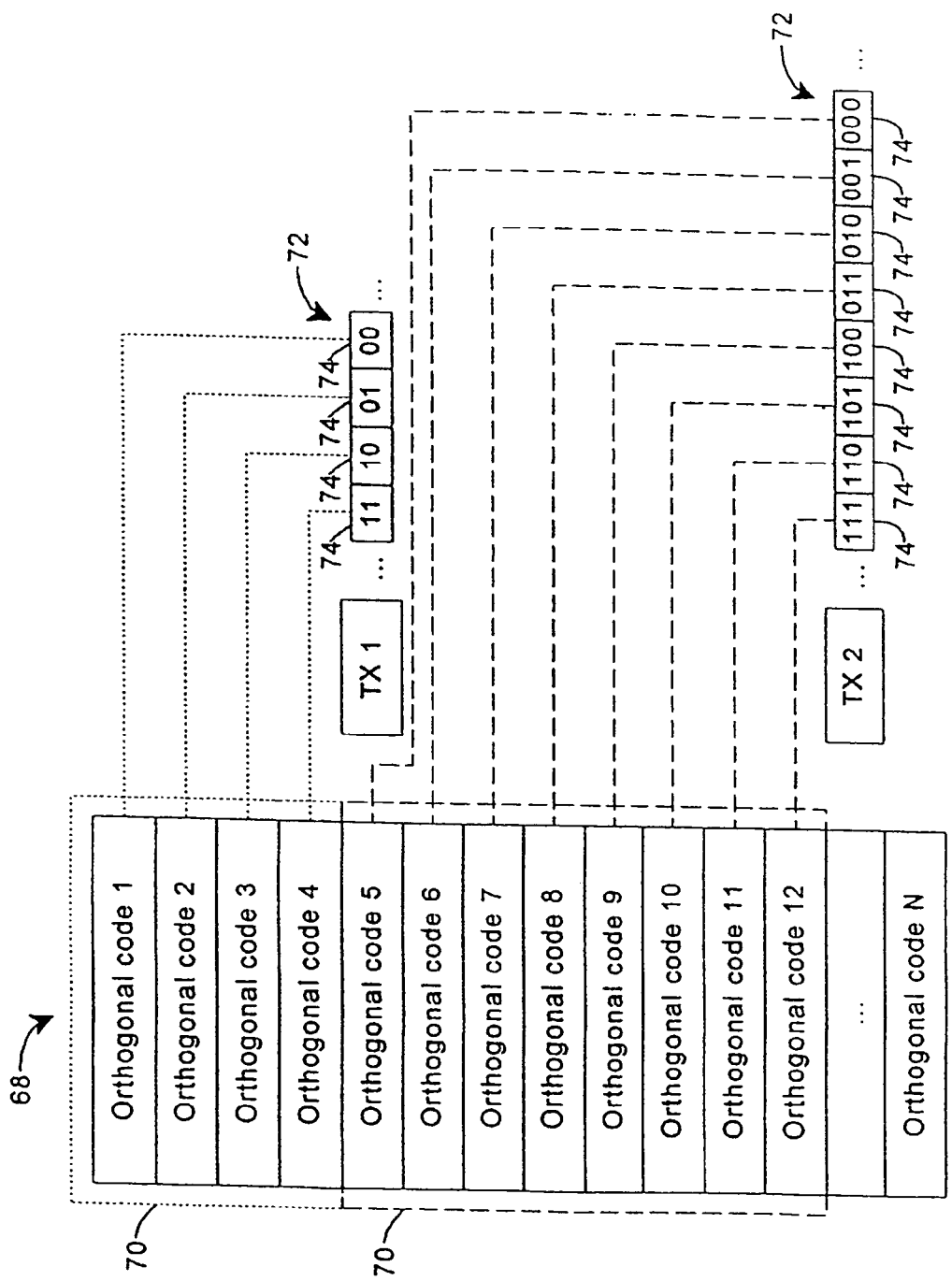
FIG. 5 is a mapping diagram showing members of subsets of orthogonal codes and their relationship to data signal bit sequences.
Figure 6:
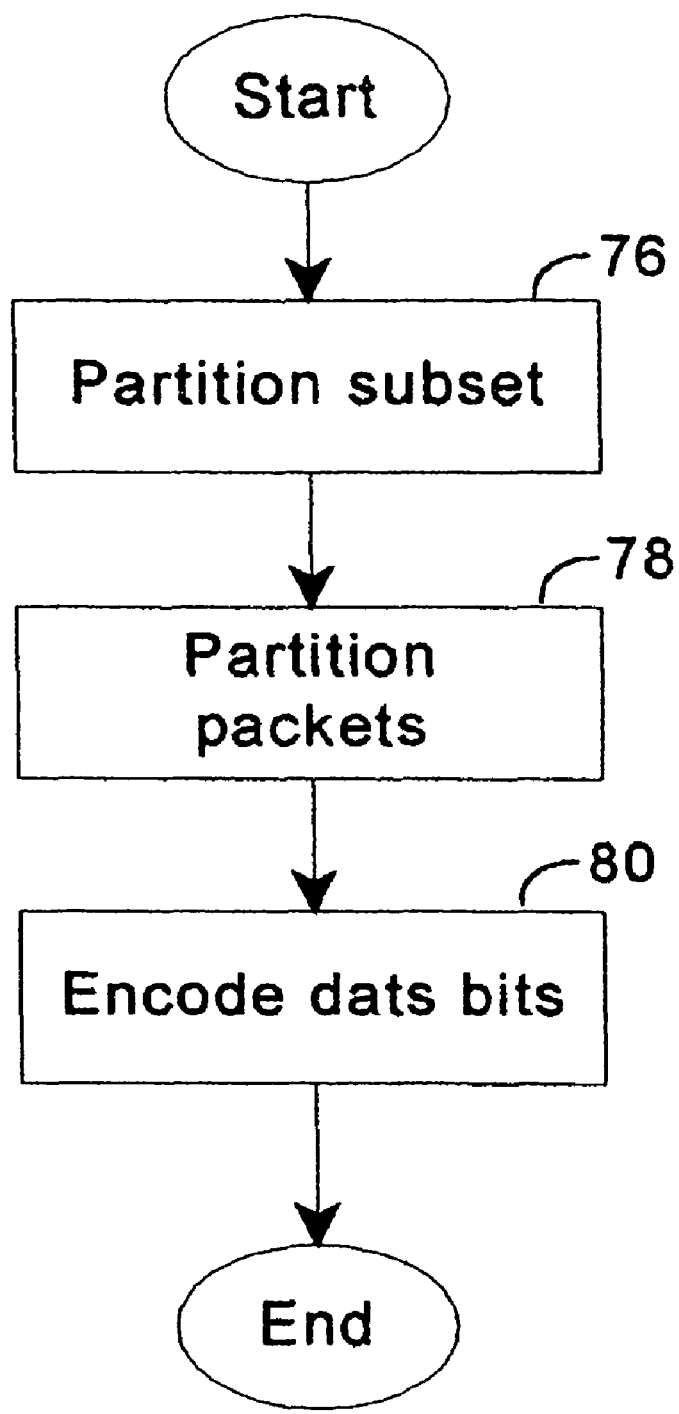
FIG. 6 is a flowchart of a program that can be implemented by a base station or terminal to encode data for one or more transmissions in accordance with the teachings of the present invention; and, FIG. 7 is a flowchart of a program that can be implemented by a base station or terminal to encode data for transmission while decreasing power, increasing data rate, and/or decreasing error rates in accordance with the teachings of the present invention.

In the preferred embodiment, the orthogonal encoder 38 may be used to encode multiple data streams. For example, a base station 10 may transmit to a plurality of terminals 14. In such an instance the orthogonal encoder 38 may use a lookup table as shown in FIG. 5. In the lookup table, a set of possible orthogonal codes 68 is partitioned into two or more subsets 70. The set 68 may or may not be derived from another set. Preferably, one subset 70 is assigned for each simultaneous transmission (e.g., one subset 70 for each active terminal being serviced by a particular base station). The number of members in a particular subset 70 may be different than the number of members in another subset 70. Preferably, at least one subset 70 has at least three members. The number of members may be determined by the transmission requirements of the data signal 20 the subset 70 will be used to encode. For example, if a particular data signal 20 requires a relatively high data rate, then a subset 70 with a relatively large number of members is preferably partitioned (e.g., video signals may need higher data rates than audio signals). Similarly, if a particular data signal 20 requires a relatively low error rate, then a subset 70 with a relatively large number of members is preferably partitioned (e.g., computer data may need a lower error rate than audio signals). Likewise, if a particular data signal 20 requires a relatively low power level, then a subset 70 with a relatively large number of members is preferably partitioned (e.g., a terminal with a small or low battery may require lower power levels).

A data signal 20, represented by a plurality of data bits 72, is preferably partitioned into packets 74 prior to transmission. If the number of members in the subset 70 of orthogonal codes 68 used to encode a transmission equals M, then the number of data bits 72 partitioned into example, a base station 10 may partition a set of orthogonal codes 68 into a subset of orthogonal codes 70 and communicate that subset 70 to a terminal 14 so that the terminal 14 can use the subset to encode transmission. In an alternate embodiment, a base station 10 may transmit a set of available orthogonal codes (i.e., orthogonal codes not assigned to any transmissions in that system) and allow a terminal 14 to select a subset of the available orthogonal codes. If the set of orthogonal codes assigned to a particular transmission constitutes an increase in the number of members, the power associated with that transmission may be decreased. If the overall power of a CDMA communication system is decreased, the number of transmissions capable of utilizing the system at a given time (i.e., the capacity) is increased as a result of a reduced noise floor. Similarly, if the number of members assigned to a particular transmission is increased, the data rate associated with that transmission may be increased. If the number of orthogonal codes in the set 68 being used to encode data is increased, the amount of data being transmitted by the CDMA communication is increased. Further, if the number of members assigned to a transmission is increased, an error code, such as a well known error detection and/or correction code (e.g., cyclic redundancy check), may be lengthened, thereby decreasing the number of errors in the CDMA communication system. It will be appreciated by persons of ordinary skill in the art that combinations of manipulating the power, data rate, and/or error rate to meet various objectives and requirements are possible without departing from the scope of the present invention.

Figure 7:
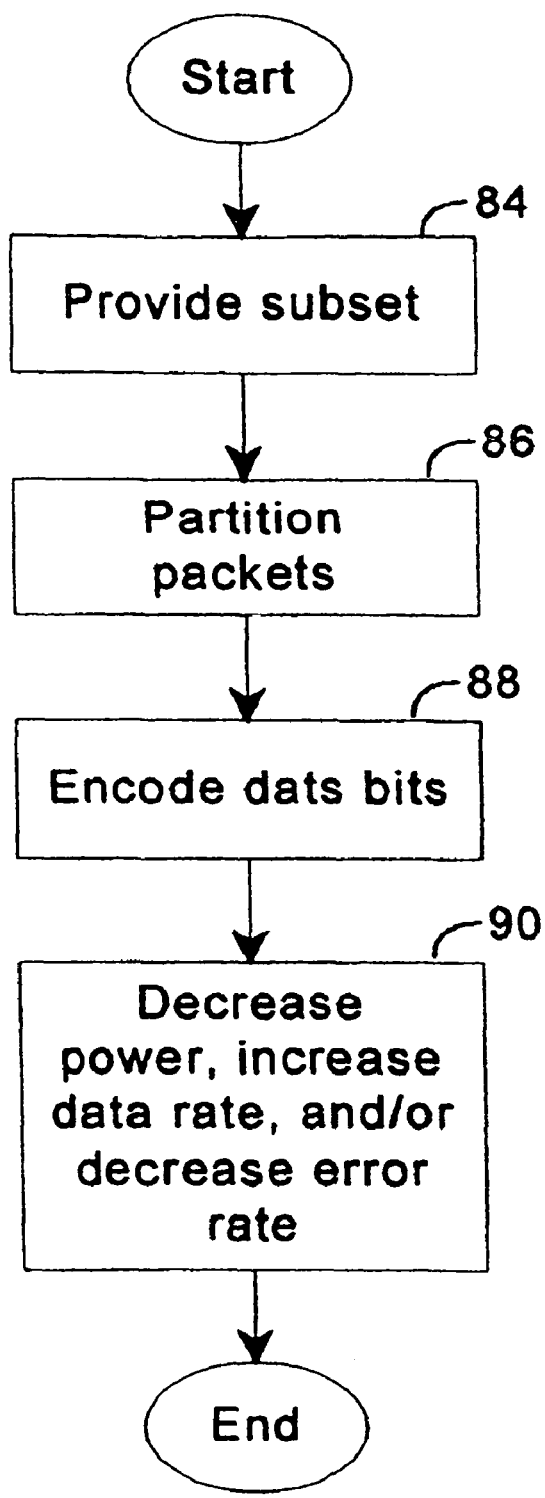

A flow chart of a program that can be implemented by a base station 10 and/or a terminal 14 to encode data in accordance with the teachings of the present invention is illustrated in FIG. 7. Again, the programmed steps are performed by a control circuit such as a microprocessor or application specific integrated circuit (ASIC) as is conventional. Once the program is initiated (e.g., a terminal 14 has data to transmit to a base station 10 or vice versa), the control circuit provides a set 68 or a subset 70 of orthogonal codes (block 84). The number of members in the set 68 or a subset 70 could be directly or indirectly requested by the transmitter and/or the receiver of the data. Similarly, the number of members in the set 68 or a subset 70 could be determined by convention, protocol, power requirements, data rate requirement, error rate requirements, and/or any other method. Once the set 68 or a subset 70 of orthogonal codes has been provided, the data to be transmitted is partitioned into packets of data bits 74 (block 86). Each packet of data bits 74 is preferably of length sufficiently small enough as to be represented by the members of the set 68 or a subset 70 provided. Subsequently, each packet 74 is encoded by representing it with a corresponding member of the set 68 or a subset 70 (block 88). Preferably the number of members in the set 68 or a subset 70 increases allowing for a decrease in the power level (block 90) necessary to maintain the prior level of communication quality. Similarly, an increase in the number of members in the set 68 or subset 70 provided, allows for an increase in the data rate (block 90) and/or a decrease in the error rate (block 90) associated with the data being encoded.

In summary, persons of ordinary skill in the art will readily appreciate that a method and apparatus for encoding data for transmission in a communication system has been provided. Systems implementing the teachings of the invention can enjoy increased efficiency in bandwidth utilization through higher data rates, lower error rates, lower power levels, and/or increased capacity.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method comprising:
   partitioning a set of orthogonal codes into one or more subsets of orthogonal codes;
   partitioning a signal of data symbols into a plurality of packets, each packet being of a size comprising at least two data symbols; and
   encoding each of the plurality of packets with an orthogonal code from a one of the one or more subsets of orthogonal codes for transmission of the signal in a communication system, wherein the encoding includes mapping each of the packets to the orthogonal code of the one subset; and
   wherein either the set of orthogonal codes or the one subset of orthogonal codes is provided by a base station to a terminal, and
   wherein a number of orthogonal codes contained in the one subset of orthogonal codes is determined to facilitate a decrease in power required for the transmission while maintaining or increasing transmission capacity.

2. A method as claimed in claim 1, wherein the partitioning of the signal and the encoding steps are performed at the terminal.

3. A method as claimed in claim 1, wherein the partitioning of the set of orthogonal codes, the partitioning of the signal and the encoding steps are performed at the terminal.

4. A method as claimed in claim 1, wherein the one subset of orthogonal codes includes at least three of the orthogonal codes.

5. A method as claimed in claim 1, wherein the communication system is a code division multiple access (CDMA) system.

6. A method comprising:
    partitioning a set of orthogonal codes into one or more subsets of orthogonal codes;
    partitioning a signal of data symbols into a plurality of packets, each packet being of a size comprising at least two data symbols; and
    encoding each of the plurality of packets with an orthogonal code from a one of the one or more subsets of orthogonal codes for transmission of the signal in a communication system, wherein the encoding includes mapping each of the packets to the orthogonal code of the one subset; and
    wherein either the set of orthogonal codes or the one subset of orthogonal codes is provided by a base station to a terminal, and
    wherein a number of orthogonal codes contained in the one subset of orthogonal codes is determined to facilitate one or more of a decrease in power required for the transmission while maintaining or increasing transmission capacity, an increase in transmission data rate, and a decrease in transmission error rate.

7. A method as claimed in claim 6, wherein the partitioning of the signal and the encoding steps are performed at the terminal.

8. A method as claimed in claim 6, wherein the partitioning of the set of orthogonal codes, the partitioning of the signal and the encoding steps are performed at the terminal.

9. A method as claimed in claim 6, wherein the one subset of orthogonal codes includes at least three of the orthogonal codes.

10. A method as claimed in claim 6, wherein the communication system is a code division multiple access (CDMA) system.

11. An apparatus comprising:
    a code partitioner configured to partition a set of orthogonal codes into one or more subsets of orthogonal codes;
    a signal partitioner configured to partition a signal of data symbols into a plurality of packets, each packet being of a size comprising at least two data symbols; and
    an encoder configured to encode each of the plurality of packets with an orthogonal code from a one of the one or more subsets of orthogonal codes for transmission of the signal in a communication system, wherein the encoding includes mapping each of the packets to the orthogonal code of the one subset; and
    wherein either the set of orthogonal codes or the one subset of orthogonal codes is provided by a base station to a terminal, and
    wherein a number of orthogonal codes contained in the one subset of orthogonal codes is determined to facilitate a decrease in power required for the transmission while maintaining or increasing transmission capacity.

12. An apparatus as claimed in claim 11, wherein the apparatus resides within the terminal.

13. An apparatus as claimed in claim 11, wherein the one subset of orthogonal codes includes at least three of the orthogonal codes.

14. An apparatus as claimed in claim 11, wherein the communication system is a code division multiple access (CDMA) system.

15. An apparatus comprising:
    a code partitioner configured to partition a set of orthogonal codes into one or more subsets of orthogonal codes;
    a signal partitioner configured to partition a signal of data symbols into a plurality of packets, each packet being of a size comprising at least two data symbols; and
    an encoder configured to encode each of the plurality of packets with an orthogonal code from a one of the one or more subsets of orthogonal codes for transmission of the signal in a communication system, wherein the encoding includes mapping each of the packets to the orthogonal code of the one subset; and
    wherein either the set of orthogonal codes or the one subset of orthogonal codes is provided by a base station to a terminal, and
    wherein a number of orthogonal codes contained in the one subset of orthogonal codes is determined to facilitate one or more of a decrease in power required for the transmission while maintaining or increasing transmission capacity, an increase in transmission data rate, and a decrease in transmission error rate.

16. An apparatus as claimed in claim 15, wherein the apparatus resides within the terminal.

17. An apparatus as claimed in claim 15, wherein the one subset of orthogonal codes includes at least three of the orthogonal codes.

18. An apparatus as claimed in claim 15, wherein the communication system is a code division multiple access (CDMA) system.

* * * * *